United States Patent Office 3,410,808
Patented Nov. 12, 1968

3,410,808
ZEOLITIC MATERIALS
Warren M. Smith and Elroy M. Gladrow, Baton Rouge, La., assignors to Esso Research and Engineering Company, a corporation of Delaware
No Drawing. Continuation-in-part of application Ser. No. 485,095, Sept. 3, 1965. This application June 8, 1967, Ser. No. 644,486
19 Claims. (Cl. 252—453)

ABSTRACT OF THE DISCLOSURE

Catalyst compositions comprising crystalline alumino-silicate zeolites distributed throughout a siliceous matrix are prepared by combining the zeolite crystals while contained in their mother liquor with alkali metal silicate, gelling the silicate either before or after its admixture with the mother liquor slurry, and reacting with a metal salt, such as aluminum sulfate salt, to incorporate $Al_2O_3$. Preferred catalyst comprises faujasite in silica-alumina matrix.

Reference to copending application

This application is a continuation-in-part of copending application Ser. No. 485,095, filed Sept. 3, 1965, now abandoned.

Background of the invention

Field of the invention.—This invention relates to an improved process for preparing synthetic crystalline alumino-silicate zeolite-containing materials, the products thereby produced, and their use in catalytic conversion processes. Particularly, it relates to the preparation of catalysts comprising crystalline alumino-silicate zeolite distributed throughout a siliceous matrix. More particularly, it relates to the preparation of crystalline alumino-silicate zeolite materials having relatively high silica-to-alumina mole ratios which are distributed throughout a siliceous matrix.

Description of prior art.—Crystalline alumino-silicate zeolites, commonly referred to as "molecular sieves," are now well known in the art. They are characterized by their highly ordered crystalline structure and uniformly dimensioned pores and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (i.e., not adsorbed) by a particular sieve. A number of these zeolite materials are described, for example, in U.S. Patent No. 3,069,362, wherein they are characterized by their composition and X-ray diffraction characteristics.

The crystalline alumino-silicate zeolites within the purview of the present invention will be of the synthetic variety characterized by uniform pore dimensions in the general range of between about 4 to 15 A. in diameter, preferably 6 to 13 A. Among the well-recognized types of zeolites are the "Type A," "Type Y," "Type X," mordenite, etc., which differ in the ratio of silica to alumina contained in the final crystalline structure; Type X having a ratio below 3, e.g. about 2 to 3, Type Y having a ratio above 3, e.g. about 3 to 7, mordenite having a ratio of about 7 to 11, e.g. 9 to 10, etc. The synthetic zeolites which will be preferred in the present invention include both the Type X and Type Y varieties, as well as synthetic mordenite, erionite, and gmelinite.

In addition to their extensive use as adsorbents for hydrocarbon separation processes and the like, these crystalline alumino-silicate zeolites have recently drawn considerable attention directed to their unique catalytic properties in various processes, particularly hydrocarbon conversion processes. However, the use of these crystalline materials for catalytic purposes does suffer from various drawbacks. For example, one of the problems encountered has been the difficulty of handling the extremely fine zeolite crystals, which can be less than 5 microns in size, in fluidized or moving bed processes. Further, the crystalline zeolite may often be unsuitable for direct use as a catalyst because of too high an activity which can lead to over-conversion and runaway reactions. Also, the stability of certain of these alumino-silicate zeolite materials at high temperatures or upon steam treatment is often too low for commercial acceptance. Steam stability refers to the ability of a catalyst to resist rapid deactivation in the presence of steam. Steam is used, for example, to assist in the regeneration of catalysts which have become deactivated as a result of coke deposition. The catalyst is usually stripped of entrained oil by contact with steam and then treated with oxygen-containing gases at high temperatures to combust carbonaceous deposits. Still another disadvantage associated with the use of crystalline alumino-silicate zeolite catalysts resides in the fragility of the zeolite crystal agglomerates which are commonly subject to considerable abrasion, breakage, and attrition loss when used in the form of a continuously moving stream, such as in a fluidized operation.

The above disadvantages led to a recent development of combining the alumino-sicalate zeolite crystals with a siliceous matrix, such as silica-alumina, so that the zeolite crystals become suspended in and distributed throughout the matrix. This newly-developed composite catalyst will hereinafter be referred to as the "encapsulated" version, due to the coating of the zeolite crystals with siliceous gel. The encapsulated version of the catalyst, consisting of crystalline alumino-silicate zeolite embedded in conventional siliceous material, such as silica-alumina, is characterized by a high resistance to attrition, high activity, and exceptional selectivity and steam stability. It has been prepared, for example, by dispersing the zeolite product crystals in a suitable siliceous sol and gelling the sol by various means. Certain procedures for preparing this encapsulated catalyst are described in U.S. Patent No. 3,140,249. Other procedures have involved the addition of zeolite crystals to a gelatinous precipitate of silica-alumina or silica-alumina hydrogel and spray drying of the admixture to form spheroidal composite particles consisting of zeolite crystals encapsulated in silica-alumina gel matrix.

The present invention is concerned with an improved process for preparing the above-mentioned zeolite-siliceous matrix composite products, the products thereby obtained, and their use as catalysts. To better comprehend the advantages of the present invention, an understanding of the details of crystalline zeolite synthesis will be desired.

The process for preparing crystalline alumino-silicate zeolites having uniform pore openings are now well known in the art. These methods generally involve the reaction of predetermined amounts and ratios of silica, alumina, and alkali metal oxide and water. Alumina may be supplied in the form of sodium aluminate or an alumina sol or the like; silica may be supplied in the form of sodium silicate and/or silica gel and/or silica sol; and alkali may be furnished by an alkaline hydroxide, e.g. sodium hydroxide. As taught in the art, careful control is kept over the pH, sodium ion concentration, and the crystallization period. Suitable processes for preparing crystalline zeolites are described, for example, in U.S. Patent Nos. 2,882,244, 2,971,903, and 3,130,007. After their preparation and removal of extraneous soluble materials, the zeolites may be dehydrated, e.g. by calcination, at elevated temperature.

In general, the chemical formula of anhydrous crystalline alumino-silicate zeolites, expressed in terms of moles, may be represented as:

$$0.9 \pm 0.2 M_{2/n}O : Al_2O_3 : XSiO_2$$

wherein M is selected from the group consisting of metal cations and hydrogen, $n$ is its valence, and X is a number from about 1.5 to about 12, preferably 2 to 10. The zeolite as produced or found in nature normally contains an alkali metal, such as sodium or an alkaline earth metal, such as calcium. The zeolite which will be most preferred in the present invention is the synthetic faujasite variety, wherein X in the above formula will be about 2.5 to 7, preferably 3 to 6, most preferably 4 to 5.5. Crystalline zeolites having relatively high silica-to-alumina ratios, i.e., above about 3, are more active, selective, and stable than those having relatively low ratios. It will usually have an average pore diameter of about 6 to 15, e.g., 7 to 13, A. A conventional scheme for preparing synthetic sodium faujasite is as follows:

Colloidal silica or silica hydrosol is mixed with a solution of sodium hydroxide and sodium aluminate at ambient temperature. Suitable reactant molar ratios fall within the following ranges: $Na_2O/SiO_2$, 0.28 to 0.80; $SiO_2/Al_2O_3$, 4 to 40; $H_2O/Na_2O$, 15 to 60. The reaction mixture is preferably allowed to digest at ambient temperature for up to 40 hours or more, preferably 1 to 15 hours, or cooled to below about 80° F., in order to aid crystallization, and then heated to and held at about 180° to 250° F., e.g., 200° to 220° F., for a sufficient period to crystallize the product and to achieve maximum crystallinity, e.g., 24 to 200 hours or more, typically 50 to 100 hours. A crystalline hydrated sodium alumino-silicate zeolite having a faujasite structure is then separated from the aqueous mother liquor by decantation or filtration, washed, and dried to recover a crystalline product. It is then calcined at temperatures up to about 1000° F. in order to remove the water of hydration and thereby form the interstitial channels which confer adsorptive and catalytic properties.

The prior art zeolite synthesis processes have thus generally employed a distinct separation of the zeolite product crystals from their mother liquor prior to their incorporation into the siliceous matrix material. It is one of the principal purposes of the present invention to effect the formation of a zeolite-siliceous matrix composite product by a procedure which does not require this distinct separation of the zeolite product crystals from their mother liquor. By means of the present process, the various intermediate steps, e.g., filtration, washing, drying, and final reslurrying of the zeolite crystals, are conveniently eliminated without deleteriously affecting product quality. An additional economic saving is realized by the constructive use of residual siliceous materials in the mother liquor.

Summary of the invention

In brief compass, the present invention involves the admixture of the mother liquor slurry of zeolite crystals resulting from the zeolite synthesis with a metal silicate of the type conventionally used in the preparation of siliceous amorphous gels, such as silica-alumina. The metal silicate is initially supplied in the form of a solution. In a first embodiment, the metal silicate is gelled by suitable means prior to admixture with the zeolite mother liquor slurry. In a second embodiment, the sodium silicate solution is admixed with the zeolite mother liquor slurry and the entire mass is thereafter gelled by suitable means. In either case, the resulting admixture is aged at controlled conditions, prior to addition of a desired metal oxide to the mixture of gel and zeolite crystals. The desired end product will usually comprise crystalline zeolite embedded in silica-alumina.

In the second embodiment mentioned above, the mother liquor slurry of zeolite crystals is preferably diluted and added to a sodium silicate solution. The excess sodium silicate in the mother liquor resulting from the zeolite synthesis and the sodium silicate supplied from the above solution are gelled, preferably by bubbling carbon dioxide through the mixture and/or by the addition of acid or an acidic salt. In this manner the excess sodium silicate reactant is constructively used to supply a portion of the ultimate silica content of the gel matrix. After suitable aging at controlled conditions, aluminum sulfate is added to the zeolite-silicate gel mixture. Carbon dioxide is evolved and alumina is precipitated on the silica with proper pH maintenance. This mixture is then filtered and dried.

In the first embodiment mentioned above, which will be preferred, the sodium silicate solution is first gelled, preferably by the means just described, prior to combination with the mother liquor slurry of zeolite crystals. The mother liquor slurry is added to the gelled sodium silicate, the mixture aged at controlled conditions, and then combined with a suitable source of desired metal oxide, e.g. aluminum sulfate, to form the ultimate zeolite in silica-alumina matrix catalyst. The gelled silicate may be aged at controlled conditions prior to combination with the mother liquor slurry, although it will be preferred to effect this combination before this aging step so as to take advantage of the extraneous carbon dioxide to gel the silica present in the mother liquor.

It will be readily observed that the instant process provides substantial economic benefit: firstly, by eliminating the conventional separation of the zeolite crystals from their mother liquor; secondly, by the constructive utilization of unreacted silicate present in the mother liquor which would otherwise be discarded. Furthermore, use of the present process also facilitates the removal of soluble sodium impurity in the final product, since removal of the sodium from the excess silicate derived from the mother liquor by washing, base exchange, etc., is relatively easier when the silicate has first been gelled and reacted as described above.

It will be understood, of course, that the present invention is not limited to the use of silica-alumina gel matrix but that other inorganic oxide matrices can be prepared and employed. For example, the above-described preparation can be varied by elimination of the aluminum sulfate addition, in which case a zeolite-silica gel matrix will be produced. Moreover, cogels other than silica-alumina can be employed. In general, the present invention contemplates the use of silica gel, as well as cogels of silica, and one or more oxides of metals in Groups II-A, III-A, and IV-B of the Periodic Table (Handbook of Chemistry and Physics, 38th Edition), e.g., alumina, magnesia, zirconia, titania, etc. Suitable cogels include, for example, silica-alumina, silica-magnesia, silica-zirconia, silica-thoria, silica-beryllia, silica-titania, as well as ternary combinations, such as silica-alumina-zirconia, silica-alumina-magnesia, silica-magnesia-zirconia, etc. Preferred cogels will include silica-alumina, silica-alumina-zirconia, silica-magnesia, and silica-alumina-magnesia, with silica-alumina being particularly preferred. These gels and cogels will generally comprise a major proportion of silica and a minor proportion of the other aforementioned oxide or oxides. Thus the silica content of the siliceous gel or cogel matrix will generally fall within the range of 55 to 100 wt. percent, preferably 60 to 90 wt. percent, and the other metal oxide or oxides content will generally fall within the range of 0 to 45 wt. percent, preferably 10 to 40 wt. percent. For the particularly preferred silica-alumina matrix, the alumina content will preferably be about 8 to 40 wt. percent, more preferably 12 to 30 wt. percent. These other metal oxides will be formed by conventional procedures; e.g., instead of adding aluminum sulfate to the gelled silicate, suitable metal salts of the aforementioned metals will be employed, such as, for example, the nitrates, halides, and acetates of aluminum, magnesium, and zirconium under controlled pH conditions to ensure proper incorporation into the gel structure.

Thus, in its broadest aspect, the process of the invention will involve admixing the mother liquor slurry of zeolite crystals containing excess unreacted alkali metal silicate with a suitable source of silica, such as an alkali metal silicate (e.g., sodium silicate) or a silica hydrosol; gelling the latter before said admixture is formed or subjecting said admixture to a gelation step; and thereafter reacting the gelled admixture, if desired, with a suitable salt of a metal in Groups II–A, III–A, and IV–B to provide the corresponding metal oxide. The gelation step can be accomplished by a number of means, most convenient of which will be the aforementioned carbon dioxide treatment, but which may also include mixing the alkali metal silicate or the alkali metal silicate-mother liquor slurry containing zeolite crystals with strong mineral acids, such as $H_2SO_4$ or HCl to a resultant pH no lower than 3.0.

The process of the present invention will now be described in greater detail by specifying particularly preferred characteristics of the embodiments previously described. It will be understood, however, that the invention is not intended to be so limited.

A sodium synthetic faujasite type of crystalline zeolite is prepared by the aforedescribed procedure. At the end of the crystallization period, the crystallization mixture will usually contain about 24 to 40 wt. percent, e.g. 30 to 37 wt. percent, total solids, of which about 60 to 85 wt. percent is crystalline zeolite; the remainder being unreacted reactant materials and by-products present in the mother liquor, comprising principally sodium and residual silicate ions with a very small amount of unreacted soluble aluminate. The pH will usually be about 9 to 12. The major impurity will be sodium silicate, present in an amount of about 6 to 15 wt. percent of the total crystallization mixture. The crystallization mixture is preferably diluted with water to reduce its total solids to about 10 to 20 wt. percent, and the diluted mixture is then combined with an alkali metal silicate, e.g., sodium silicate, solution, preferably containing 4 to 12, e.g., 6 to 10, wt. percent silica. Sufficient sodium silicate will be employed to produce 60 to 100, preferably 70 to 90, wt. percent amorphous silica in the matrix components of the final product, including that derived from the mother liquor.

In the first embodiment, the sodium silicate is pregelled, by appropriate means, preferably by addition of carbon dioxide at a temperature of about 80 to 140° F., preferably 95 to 120° F., with agitation. The silica content of the dilute silicate solution is in the range of about 40 to about 120 grams/liter. Depending on temperature, sodium silicate concentration and the amount of $CO_2$ employed, gelation occurs in about 30 seconds to 5 minutes. The pH of the silicate should be lowered to about 8.5 to 10.5., preferably about 10.0, to achieve gelation. To the gelled silicate contained in an aging tank is then added the slurry of zeolite crystals in the mother liquor containing unreacted silicate. Alternatively, the mother liquor slurry may be added continuously to the line bringing the $CO_2$ treated silicate stream to the aging tank. The mixture of the mother liquor slurry and the $CO_2$-treated silicate is then aged at the aforesaid elevated temperature for 0.3 to 3.0 hours, preferably 0.75 to 1.5 hours prior to aluminum salt addition. (As a less preferred variation of this embodiment, the mother liquor slurry may be added to the gelled silicate after, instead of before, the aging period as outlined above.)

In the second embodiment, the combined mixture of sodium silicate solution, and mother liquor slurry of zeolite crystals containing unreacted silicate, is then gelled by appropriate means, preferably by adding carbon dioxide to the mixture at a temperature of about 80° to 140° F., preferably about 80° to 120° F., with continued agitation. Depending on temperature, sodium silicate concentration, and the amount of $CO_2$ employed, gelation of the silica may require from about 15 seconds to 10 minutes. The pH of the system is lowered by the acidic gas to the range of 9 to 10.5 at the time of gelation. After the mixture has gelled sufficiently, the gel is preferably broken up and aged with mixing for up to about 2 hours, preferably 45 minutes to 1.5 hours, at the aforesaid temperature.

At this point (in either embodiment) an aluminum salt solution, preferably aluminum sulfate solution having a specific gravity in the range of 1.15 to 1.32, is added to the stirred gel mixture, and the overall pH is adjusted to about 4 to 7, preferably 4.8 to 6. Sufficient aluminum sulfate will be employed to produce 10 to 30 wt. percent amorphous alumina in the matrix component of the final product. The gelatinous mixture is then filtered to remove some of the soluble sodium salts, reslurried with added water to bring the silica-alumina content of the composite mixture to about 6 to 10 wt. percent, and finally spray dried at typical temperatures of 550 to 1000° F. or higher. If desired, the material can be dried in an oven at lower temperatures and the dried material ground to give the proper particle size range. If magnesia or titania is to be introduced into the gel matrix, then the procedure is altered accordingly as would be apparent to those skilled in the art of catalyst manufacture.

Through the use of the above specific procedure, the product will contain about 2 to 20 wt. percent, preferably 4 to 12 wt. percent, crystalline zeolite embedded in a silica-alumina matrix containing about 60 to 95 wt. percent, preferably 70 to 90 wt. percent silica. By varying the proportions of the various ingredients, products of the present invention can be prepared generally containing 2 to 40 wt. percent zeolite, the exact proportion depending upon the intended end use of the final product.

The composite of crystalline zeolite embedded in the amorphous gel matrix prepared in accordance with the present invention has been found to exhibit superior catalytic properties for catalytic cracking, hydrocracking, etc. When a catalytic material is desired, it will be preferable to subject the zeolite-gel matrix composite to ion exchange with suitable cations to yield the desired catalytic properties. For use in the present invention a substantial portion of the alkali metal, e.g., sodium, in the zeolite is replaced with a cation (either a metal cation or a hydrogen-containing cation, e.g., $NH_4^+$) so as to reduce the alkali metal oxide (e.g., $Na_2O$) content of the zeolite to less than about 10 wt. percent. Preferably, a major portion of the cation content of the zeolite is supplied by a cation other than sodium. More preferably, about 5 wt. percent $Na_2O$, and most preferably about 1 to 5 wt. percent $Na_2O$ (based on zeolite), will remain. Preferably, the ion exchange will be accomplished after the unexchanged zeolite has been combined with the siliceous matrix in accordance with the invention. Base exchange is effected by treatment with a solution containing a cation capable of replacing alkali metal and is continued for a sufficient period of time to reduce the alkali metal content to the desired values hereinbefore set forth. As mentioned, the cation used for the base exchange can be a metal cation or a hydrogen-containing cation or a mixture thereof. The metal cation can be a cation of metals in Groups I–B to VIII and the rare earth metals, more preferably metals in Groups II–A, III–B, and the rare earth metals. More than one cation can be introduced either simultaneously or by successive exchange treatments. Particularly preferred cations will be hydrogen or hydrogen-containing cations, e.g., ammonium ion, and/or alkaline earth metal cations, e.g., magnesium cations. Examples of other suitable cations, depending upon the particular desired use, will include barium, calcium, rare earth metals, such as cerium, praseodymium, lanthanum, neodymium, and samarium, as well as manganese, strontium, zinc, zirconium, etc. It will be understood that mixtures of these various cations, and mixtures of the same with other ions, such as ammonium, can be employed. While base exchange is ordinarily conducted in an aqueous medium, nonaqueous solutions, e.g., alcoholic solutions, can be employed, assuming, of course, that ionization can occur.

Base exchange treatment is accomplished in conventional manner by procedures well known to the art. Normally, the zeolite or zeolite-containing product is exchanged with a suitable salt of the above metals or a hydrogen-containing cation solution, at a temperature of 60° to 180° F. via conventional ion exchange techniques. Suitable salt solutions include the sulfates, nitrates, chlorides, carbonates, etc. Organic salts can also be used, such as acetates, formates, etc. The cation concentration in the treating solution and the length and number of ion exchange treatments will be determined readily according to the extent of ion exchange desired. Similarly, the temperature at which base exchange can be effective is subject to wide variation, generally from room temperature to an elevated temperature below the boiling point of the treating solution. Usually an excess of base exchange solution will be employed as will be readily apparent to those skilled in the art. It will be appreciated that the period of contact, temperature, concentration of treating solution, etc., are all interrelated variables which will be again determined by the degree of ion exchange to be accomplished which should be sufficient to reduce the alkali metal oxide content of the zeolite to the values hereinbefore set forth. After the base exchange treatment, the product is separated, washed, and dried either at ambient temperature or at elevated temperature, e.g., 150° to 600° F.

The catalyst composition hereinbefore described is highly effective for various hydrocarbon conversion reactions, the most notable of which being catalytic cracking. Moreover, it is within the scope of the present invention to modify the catalyst composition by incorporation of various other catalytic components capable of promoting a particularly desired reaction or of shifting a particular equilibrium in a desired direction. For example, it may be desired to incorporate a hydrogenation component, e.g., a noble metal, for such reactions as hydrocracking, hydrodealkylation, etc.

Catalytic cracking with the catalyst composition hereinbefore described can be carried out in conventional manner. Suitable catalytic cracking conditions include a temperature within the general range of 700° to 1200° F. and a pressure ranging from subatmospheric pressure up to several hundred atmospheres. The usual conditions which will be employed will include a temperature of about 750° to 1000° F., e.g., 875° to 980° F., and a pressure of atmospheric to 100 p.s.i.g., e.g., atmospheric to about 20 p.s.i.g. The process can be carried out in fixed bed, moving bed, slurry, or fluidized bed operation, the latter being preferred. The contact time of the oil with the catalyst will depend upon the particular feed and the particular results desired to give a substantial degree of cracking to lower boiling products. Suitable catalyst-to-oil ratios will range from about 1 to 1 to about 20 to 1, preferably 5 to 1.

The feed stocks suitable for conversion in accordance with the invention include any of the well-known feeds conventionally employed in hydrocarbon conversion processes. Usually, they will be petroleum derived, although other sources, such as shale oil, are not to be excluded. Typical of such feeds are included heavy and light virgin gas oils, middle distillates, steam cracked naphthas, coker naphthas, catalytically cracked naphthas, cycle oils, deasphalted residua, etc.

The invention will be further understood by reference to the following examples which should not be construed as limiting.

Description of the preferred embodiments

Example 1.—A synthetic faujasite having a silica-to-alumina mole ratio of about 4.8 was prepared from a reaction mixture having a silica-to-alumina mole ratio of about 7, a soda-to-alumina mole ratio of about 2.1, and a water-to-soda ratio of about 24. The reaction mixture contained approximately 6.7 wt. percent alumina, 27.4 wt. percent silica, 8.5 wt. percent $Na_2O$, and 57.4 wt. percent water. The source of alumina and soda was a sodium aluminate liquor prepared by the reaction of sodium hydroxide and alumina trihydrate. The source of silica (and partial source of soda) was a 40% colloidal silica sol. The sodium aluminate was added to the silica sol at ambient temperature with mixing in proportions calculated to produce the aforementioned composition of the reaction mixture. The synthetic faujasite was crystallized at a crystallization temperature of about 210° F. with a total reaction period including the heatup time of about 36 hours. The reaction was terminated by addition of less than 1 volume of cold water (60° F.) per volume of reaction mixture. The mother liquor slurry of zeolite crystals had a total solids content before dilution of about 34.3 wt. percent, of which about 23.8 wt. percent was zeolite, the remainder being excess unreacted reactants, primarily sodium silicate. The sodium silicate concentration of the undiluted mother liquor was approximately 10.5 wt. percent. After dilution the mother liquor slurry contained 24 grams crystalline sodium faujasite per 100 ml. of mixture.

In accordance with one embodiment of the present invention, the mother liquor slurry prepared as above was combined with a sodium silicate solution which was thereafter gelled. Specifically, 8,000 cc. of a sodium silicate $(Na_2O \cdot 3.25SiO_2 \cdot xH_2O)$ solution having a specific gravity of 1.06 was heated to 135° F. At this point 140 cc. of the aforedescribed mother liquor slurry from the sodium faujasite synthesis (which contained 33.6 grams of sodium faujasite crystals and 14.8 grams of excess sodium silicate) were added to the sodium silicate solution with continued stirring. The temperature was maintained at 135° F., and carbon dioxide gas was bubbled through the total mixture in order to gel the silicate. The initial pH of the mixture prior to carbon dioxide treatment was greater than 12, and with continued carbon dioxide addition, the pH was gradually reduced to a value of 10.4 at which point and time the reaction mixture gelled. The gel was then broken up, agitated, and the entire mixture was aged for 1 hour at 135° F. At this point 700 cc. of an aluminum sulfate solution having a specific gravity of 1.30 and containing aluminum sulfate equivalent to 96 grams $Al_2O_3$/liter were added to the stirred gel, and the pH was adjusted to 5.6 by the addition of a small amount of dilute sulfuric acid. The gelatinous mixture was then filtered by suction, the filter cake was reslurried in 2 liters of warm (120° F.) water for 30 minutes and again suction filtered. The filter cake was then oven dried at a temperature of about 250° F. and divided into 2 fractions, samples A and B.

Sample A was reslurried in 2 liters of hot water for 10 minutes and filtered. The filter cake was slurried in 2 liters of a hot 2 wt. percent ammonium sulfate and 1 wt. percent ammonium carbonate mixed solution for 20 minutes and then filtered. The filter cake was alternately treated with four 500 cc. portions of the above fresh hot mixed salt solution and four 200 cc. portions of hot water. The filter cake was reslurried in 2 liters of the hot fresh mixed ammonium salt solution for 20 minutes, filtered, and washed with water. The composite catalyst was oven dried at 250° F. and calcined at 1000° F. The final material analyzed 0.07 wt. percent $Na_2O$ and comprised 5 wt. percent hydrogen form synthetic faujasite dispersed in a 95 wt. percent silica-alumina gel matrix. The hydrogen form was produced by evolution of ammonia during the calcination step. The final material represents a catalyst of the invention and is designated catalyst C.

Fraction B was slurried in 2 liters of hot water for 20 minutes and filtered. The filter cake was slurried in 2 liters of a hot magnesium sulfate solution containing 112 grams $MgSO_4 \cdot 7H_2O$ for 30 minutes and filtered. The filter cake was alternately treated with four 500 cc. portions of the magnesium sulfate solution and four 200 cc. portions of hot water. The cake was then reslurried in hot fresh magnesium sulfate solution as above for an additional 30 minutes followed by filtering. After washing with water and oven drying at 250° F., the material was calcined at 1000° F. The catalyst thus formed is designated catalyst D and contained 0.33 wt. percent $Na_2O$. It comprised 5 wt. percent magnesium form faujasite dispersed in a 95% silica-alumina hydrogel matrix.

Example 2.—The catalysts of this example had the same composition as catalysts C and D above but were made by the conventional and more costly procedures known to the prior art. The steps of such procedures are enumerated here in brief outline:

Synthetic sodium faujasite is made as described in Example 1, and the composite slurry is diluted with water, filtered, washed, and the cycle repeated until the pH of the filtrate is about 9 to thereby remove essentially all residual soluble sodium silicate. The sodium faujasite filter cake is slurried with $H_2O$ to a solids content of 15 wt. percent and held for further use.

In a separate system, sodium silicate solution is admixed with $CO_2$ to effect gelation, as described in Example 1, and the gel aged for about 1 hour at 100° to 110° F. The hydrogel is then admixed with an aluminum sulfate solution of such composition as to bring the pH of the mixture to about 5.6 and effect deposition of alumina within the silica gel matrix. In this instance the alumina content of the finished catalyst is about 13% based on total silica-alumina. The silica-alumina hydrogel and the faujasite slurry are passed individually at controlled rates into a common mixing zone and thence to a filter to remove a portion of the soluble salts. After reslurrying with water to bring the silica-alumina content to about 8 wt. percent, the material is spray dried.

A spray dried product prepared by the above conventional procedure was divided into 2 fractions, E and F. Fraction E was reslurried in hot $H_2O$, filtered, and exchange treated repeatedly with warm ammonium sulfate solution until the residual soda level was 0.18% as $Na_2O$. This catalyst was oven dried and calcined at 1000° F. and comprised 5 wt. percent hydrogen form synthetic faujasite dispersed in a 95 wt. percent silica-alumina gel matrix. It is designated catalyst G.

Fraction F of the above spray dried material was reslurried in hot $H_2O$, filtered, rinsed with diulte 1% ammonium sulfate solution, filtered, and then exchange treated repeatedly with $MgSO_4$ solution to reduce the soda level to 0.16% as $Na_2O$. This catalyst was oven dried and calcined at 1000° F. It comprised 5 wt. percent magnesium form synthetic faujasite dispersed in a 95 wt. percent silica-alumina gel matrix. It is designated catalyst H.

Example 3.—Catalysts C, D, G, and H were individually steamed for 16 hours at 1400° F. and 0 p.s.i.g. and then evaluated as cracking catalysts in a laboratory fluidized bed unit employing a 2-minute cycle time at a temperature of 950° F. and about atmospheric pressure. The feed stock employed was a 500° to 700° F. virgin gas oil. The cracking data for each catalyst are compared at a constant feed conversion level of 60 wt. percent to product boiling below 430° F.

TABLE I.—CATALYTIC CRACKING OF VIRGIN GAS OIL

| Catalyst | C | G | D | H |
|---|---|---|---|---|
| Zeolite form | H | H | Mg | Mg |
| Conversion, wt. percent | 60 | 60 | 60 | 60 |
| Product distribution: | | | | |
| Carbon, wt. percent | 0.9 | 1.3 | 1.1 | 1.5 |
| $C_3^-$, wt. percent | 8.8 | 9.9 | 7.5 | 7.5 |
| Total $C_4$, wt. percent | 12.3 | 12.9 | 10.3 | 11.0 |
| $C_5$—430° F., wt. percent | 38 | 35.9 | 41.1 | 40.0 |
| $C_4H_8$, wt. percent | 6.6 | 6.1 | 5.0 | 4.3 |

As demonstrated by the above data, the catalysts of the invention, C and D, exhibit superior catalytic performance over conventional catalysts of the same composition and are responsible for a substantial conversion of the gas oil feed stock to valuable lower boiling materials.

It is to be understood that the above description is merely illustrative of preferred embodiments of the invention of which many variations may be made by those skilled in the art without departing from the spirit thereof.

The previous examples have demonstrated that embodiment of the invention wherein the entire mass of sodium silicate and zeolite mother liquor slurry is gelled. The following examples are intended to illustrate the embodiment of the invention wherein the sodium silicate is pregelled, i.e. before combination with the zeolite mother liquor slurry.

Example 4.—A synthetic faujasite was prepared in accordance with the procedure of Example 1, and the mother liquor slurry therein described was combined with gelled sodium silicate. Specifically, a dilute solution of the sodium silicate described in Example 1 (1185 cc. diluted with 6800 cc. $H_2O$) was maintained at 135° F. while bubbling carbon dioxide gas with slow agitation. When the pH was reduced to about 10, gelation occurred and the $CO_2$ flow was discontinued. At this point, 140 cc. of the zeolite mother liquor slurry (of Example 1) was slowly added, and with continued stirring, the admixture was aged for one hour at about 120° F. Thereupon, 700 cc. aluminum sulfate solution was added with subsequent treatment in exact accordance with the procedure of Example 1.

The dried product was ground, washed, and exchanged with a pH 6.3 ammonium sulfate solution. The final product was dried and calcined at 1000° F. It comprised 5 wt. percent hydrogen form synthetic faujasite dispersed in 95 wt. percent silica-alumina gel matrix. It analyzed 0.39% $Na_2O$, 0.30% sulfate, 13.8 wt. percent $Al_2O_3$. It is designated Catalyst I.

Example 5.—The procedure of Example 4 was repeated except that (a) after $CO_2$ addition the gelled silicate was allowed to age for one hour at about 120° F., before addition of the mother liquor slurry; and (b) the combined gelled silicate-mother liquor slurry admixture was not aged for one hour at 120° F. prior to aluminum sulfate addition, but the latter was performed several minutes after the combination.

After washing, exchanging and calcining, the catalyst analyzed 0.43% $Na_2O$, 0.20% sulfate, and 12.85 wt. percent $Al_2O_3$.

It is designated Catalyst J.

Example 6.—A catalyst sample was prepared in the same manner as Catalyst G and is designated here as Catalyst K. Catalyst K thus represents a catalyst prepared by conventional procedures.

Catalysts I, J, and K were individually steamed for 16 hours at 1400° F. and 0 p.s.i.g. and then evaluated as cracking catalysts in a laboratory fluidized bed unit employing a 2-minute cycle time at 950° F. and about atmospheric pressure. The feedstock was a 500° to 700° F. virgin gas oil. The cracking data for each catalyst are compared at a constant conversion level of 60 wt. percent to products boiling below 430° F.

TABLE II.—CATALYTIC CRACKING OF VIRGIN GAS OIL

| | Catalyst | | |
|---|---|---|---|
| | I | J | K |
| Catalyst preparation | Add zeolite mother liquor slurry to pregelled Na-silicate, then add Al sulfate | | Add zeolite crystals to $SiO_2/Al_2O_3$ hydrogel |
| Zeolite form | H | H | H |
| Conversion, wt. percent | 60 | 60 | 60 |
| Feed rate, w./w./hr | 4.0 | 3.7 | 3.7 |
| Product distribution: | | | |
| Carbon, wt. percent | 0.9 | 0.8 | 1.4 |
| $C_3$, wt. percent | 7.4 | 6.9 | 8.0 |
| Total $C_4$, wt. percent | 11.6 | 11.7 | 12.9 |
| $C_5$—430° F., wt. percent | 40.1 | 40.6 | 37.7 |
| $C_3H_8$, wt. percent | 5.2 | 4.9 | 5.4 |
| $C_4H_8$, wt. percent | 5.9 | 6.1 | 5.5 |

The above data again demonstrate the superior performance of the catalysts of the invention; i.e. Catalysts I and J, over the conventional Catalyst K.

What is claimed is:

1. A process for preparing a catalytic composition comprising synthetic crystalline alumino-silicate zeolite distributed throughout a siliceous matrix which comprises:
   (a) synthesizing said zeolite to form a mother liquor slurry of zeolite crystals, said mother liquor slurry containing excess unreacted alkali metal silicate;
   (b) admixing said mother liquor slurry with a source of silica selected from the group consisting of alkali metal silicates and silica hydrosols in an amount sufficient to produce the desired proportion of silica in said matrix upon gelation;
   (c) gelling said silica source; and
   (d) reacting the admixture containing the gelled silica source with a sufficient amount of a salt of a metal selected from the group consisting of metals in Groups II–A, III–A, IV–B and mixtures thereof, to incorporate the corresponding metal oxide into said matrix.

2. The process of claim 1 wherein said zeolite is synthetic faujasite.

3. The process of claim 1 wherein said alkali metal is sodium.

4. The process of claim 1 wherein said gelation is accomplished by passage of carbon dioxide through said admixture.

5. The process of claim 1 wherein said metal is aluminum.

6. The process of claim 1 wherein said metal is magnesium.

7. The process of claim 1 wherein the desired proportion of silica in said matrix is within the range of about 55 to 100 wt. percent.

8. The process of claim 5 wherein the amount of zeolite crystals in said mother liquor slurry is sufficient to produce about 2 to 20 wt. percent zeolite in a silica-alumina matrix, and wherein the amounts of silica and aluminum are sufficient to produce about 80 to 98 wt. percent of a matrix containing about 60 to 95 wt. percent silica.

9. The process of claim 1 which additionally comprises base exchanging said zeolite composition with cations selected from the group consisting of hydrogen-containing cations, metal cations, and mixtures thereof, to thereby reduce its alkali metal content.

10. The process of claim 9 wherein said metal cation is magnesium.

11. The process of claim 1 wherein the silica source is a sodium silicate solution.

12. The process of claim 1 wherein gelation of the silica source is effected prior to its admixture with said mother liquor slurry in step (b).

13. The process of claim 1 wherein gelation of the silica source is effected by gelling the admixture produced in step (c).

14. A process for preparing a catalyst composition which comprises:
   (a) preparing a crystalline alumino-silicate zeolite having a faujasite structure by crystallization from a reaction mixture containing silica, soda, alumina, and water;
   (b) admixing the mother liquor slurry of zeolite crystals resulting from (a) with a sodium silicate solution;
   (c) gelling said admixture by addition of acidic material;
   (d) adding aluminum salt solution to the gelled admixture;
   (e) filtering the said admixture;
   (f) spray drying the filter cake; and
   (g) washing and base exchanging the spray dried product with cations selected from the group consisting of hydrogen-containing cations, metal cations, and mixtures thereof.

15. A process for preparing a catalyst composition which comprises:
   (a) preparing a crystalline alumino-silicate zeolite having a faujasite structure by crystallization from a reaction mixture containing silica, soda, alumina, and water;
   (b) admixing the mother liquor slurry of the zeolite crystals resulting from (a) with a sodium silicate solution which has been gelled by addition of acidic material;
   (c) adding aluminum salt solution to the admixture of step (b);
   (d) filtering the said admixture;
   (e) spray drying the filter cake; and
   (f) washing and base exchanging the spray dried product with cations selected from the group consisting of hydrogen-containing cations, metal cations, and mixtures thereof.

16. The product produced by the process of claim 1.

17. The product produced by the process of claim 5.

18. The product produced by the process of claim 14.

19. The product produced by the process of claim 15.

References Cited

UNITED STATES PATENTS

| | | | |
|---|---|---|---|
| 3,244,643 | 5/1966 | Schwartz | 252—455 |
| 3,329,627 | 7/1967 | Gladrow et al. | 252—452 |
| 3,329,628 | 7/1967 | Gladrow et al. | 252—453 |

DANIEL E. WYMAN, *Primary Examiner.*

C. F. DEES, *Assistant Examiner.*